United States Patent
Otradovec et al.

(10) Patent No.: US 10,934,012 B2
(45) Date of Patent: Mar. 2, 2021

(54) USING A PASSIVE SEPARATOR TO SEPARATE AIR AND FUEL OF A FUEL MIXTURE PASSIVELY WHEN DELIVERING FUEL TO A COMBUSTION ENGINE OF AN UNMANNED AERIAL VEHICLE

(71) Applicant: AAI Corporation, Hunt Valley, MD (US)

(72) Inventors: Daniel Thomas Otradovec, Forest Hill, MD (US); Jordan Lynn Black, York, PA (US); Alexander Foster Scott, Glen Rock, PA (US)

(73) Assignee: Textron Systems Corporation, Hunt Valley, MD (US)

( * ) Notice: Subject to any disclaimer, the term of this patent is extended or adjusted under 35 U.S.C. 154(b) by 356 days.

(21) Appl. No.: 16/003,485

(22) Filed: Jun. 8, 2018

(65) Prior Publication Data
US 2019/0375513 A1     Dec. 12, 2019

(51) Int. Cl.
| | | |
|---|---|---|
| B64D 37/34 | (2006.01) | |
| B01D 19/00 | (2006.01) | |

(Continued)

(52) U.S. Cl.
CPC ......... B64D 37/34 (2013.01); B01D 19/0031 (2013.01); F02M 37/22 (2013.01);
(Continued)

(58) Field of Classification Search
CPC ...................................................... B64D 37/34
See application file for complete search history.

(56) References Cited

U.S. PATENT DOCUMENTS

| | | | |
|---|---|---|---|
| 2,516,150 A | 7/1950 | Samiran | |
| 2,519,968 A | 8/1950 | Jordan | |

(Continued)

FOREIGN PATENT DOCUMENTS

| | | |
|---|---|---|
| CN | 205837214 | 12/2016 |
| CN | 207454109 | 6/2018 |
| GB | 2529469 | 2/2016 |

OTHER PUBLICATIONS

Otradovec, et al.; "Using a Passive Separator to Separate Air and Fuel of a Fuel Mixture Passively When Delivering Fuel to a Combustion Engine of an Unmanned Aerial Vehicle," International Search Report & Written Opinion, dated Oct. 7, 2019, pp. 1-12.

(Continued)

*Primary Examiner* — Richard G Davis
(74) *Attorney, Agent, or Firm* — BainwoodHuang

(57) ABSTRACT

A fuel delivery system has a tank, a fuel pump, and an air filtering apparatus coupled with the tank and the fuel pump. The air filtering apparatus includes a housing that defines a housing chamber, a fuel flow controller coupled with the housing, and a passive separator disposed within the housing chamber. The passive separator is constructed and arranged to separate air and fuel of a fuel mixture passively while the fuel mixture enters the housing chamber from the tank and while filtered fuel exits the housing chamber toward the fuel pump in response to operation of the fuel flow controller. Such a system is well-suited for supplying fuel to a combustion engine in which consistent fuel pressure may be critical. Furthermore, the passive separator alleviates the need for a power source for active air and fuel separation, a control mechanism, and so on.

20 Claims, 6 Drawing Sheets

(51) Int. Cl.
*F02M 37/22* (2019.01)
*F02M 37/44* (2019.01)
*B01D 36/00* (2006.01)

(52) U.S. Cl.
CPC .... *B01D 36/001* (2013.01); *B01D 2259/4575* (2013.01); *B01D 2275/40* (2013.01); *B64C 2201/044* (2013.01); *B64C 2201/063* (2013.01); *F02M 37/44* (2019.01)

(56) References Cited

U.S. PATENT DOCUMENTS

| | | | |
|---|---|---|---|
| 2,612,216 | A | 9/1952 | Samiran |
| 2,860,652 | A | 11/1958 | Badger, Jr. |
| 3,065,854 | A * | 11/1962 | Winslow ............... B01D 50/00 210/130 |
| 4,664,134 | A | 5/1987 | Pera |
| 4,691,510 | A * | 9/1987 | Taylor ............... B01D 19/0057 60/39.094 |
| 4,784,354 | A | 11/1988 | Tavano |
| 5,056,493 | A | 10/1991 | Holzer |
| 5,779,190 | A | 7/1998 | Rambo et al. |
| 6,082,671 | A | 7/2000 | Michelson |
| 6,142,421 | A | 11/2000 | Palmer |
| 6,182,714 | B1 | 2/2001 | Ginsburgh et al. |
| 6,260,797 | B1 | 7/2001 | Palmer |
| 6,315,815 | B1 | 11/2001 | Spadaccini et al. |
| 7,007,677 | B2 | 3/2006 | Toki et al. |
| 7,278,607 | B2 | 10/2007 | Fuller |
| 7,861,695 | B2 | 1/2011 | Althof et al. |
| 8,123,169 | B2 | 2/2012 | Collette |
| 8,225,822 | B2 | 7/2012 | Erben et al. |
| 8,336,810 | B2 | 12/2012 | Brutoco |
| 8,757,108 | B2 | 6/2014 | Snell |
| 8,807,123 | B2 | 8/2014 | Hassan et al. |
| 8,820,681 | B2 | 9/2014 | Brutoco |
| 9,102,391 | B2 | 8/2015 | Brutoco |
| 9,221,546 | B2 | 12/2015 | Hall |
| 9,267,428 | B2 | 2/2016 | Jonson et al. |
| 9,688,415 | B2 | 6/2017 | Hall |
| 9,726,200 | B2 | 8/2017 | Zmuda et al. |
| 9,850,865 | B2 | 12/2017 | Hayashi et al. |
| 2001/0030148 | A1 * | 10/2001 | Knight ............... B01D 36/003 210/130 |
| 2003/0218098 | A1 | 11/2003 | Goto et al. |
| 2005/0178880 | A1 | 8/2005 | Howe |
| 2013/0032672 | A1 | 2/2013 | Fenton |
| 2014/0208943 | A1 | 7/2014 | Gupta |
| 2019/0023411 | A1 * | 1/2019 | Welch ............... F04D 31/00 |
| 2019/0054423 | A1 * | 2/2019 | Cordatos ............... B01D 63/023 |
| 2019/0060787 | A1 * | 2/2019 | Cordatos ............ B01D 67/0018 |

OTHER PUBLICATIONS

"Triplex Metering Fuel Pump—POWER4FLIGHT," https://power4flight.com/uav-engine-products/triplex-metering-fuel-pump/, Sep. 13, 2018, pp. 1-2.

"Aircraft Fuel System," https://www.faa.gov/regulations_policies/handbooks_manuals/aircraft/amt_airtrame_handbook/media/ama_ch14.pdf, Chapter 14, pp. 1-62.

* cited by examiner

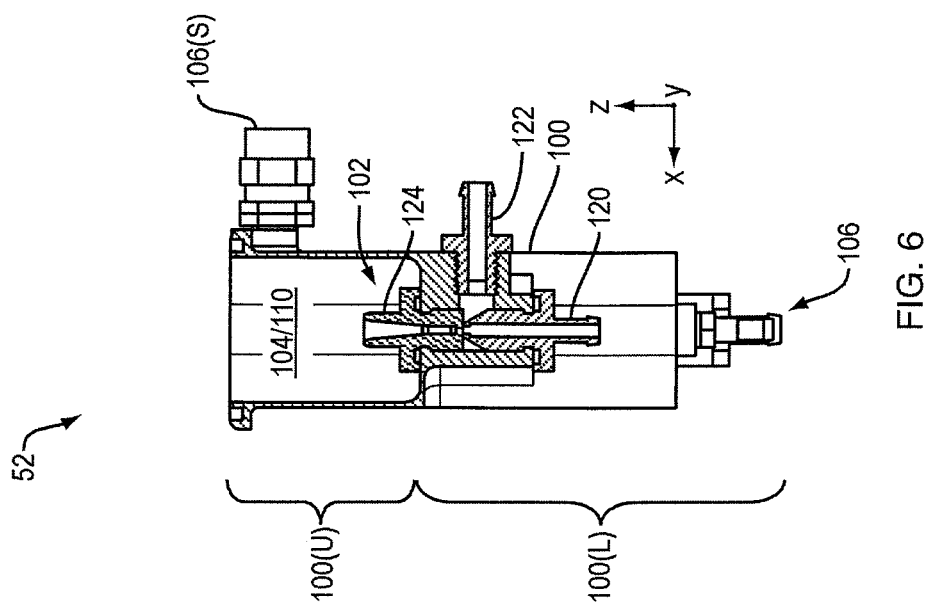
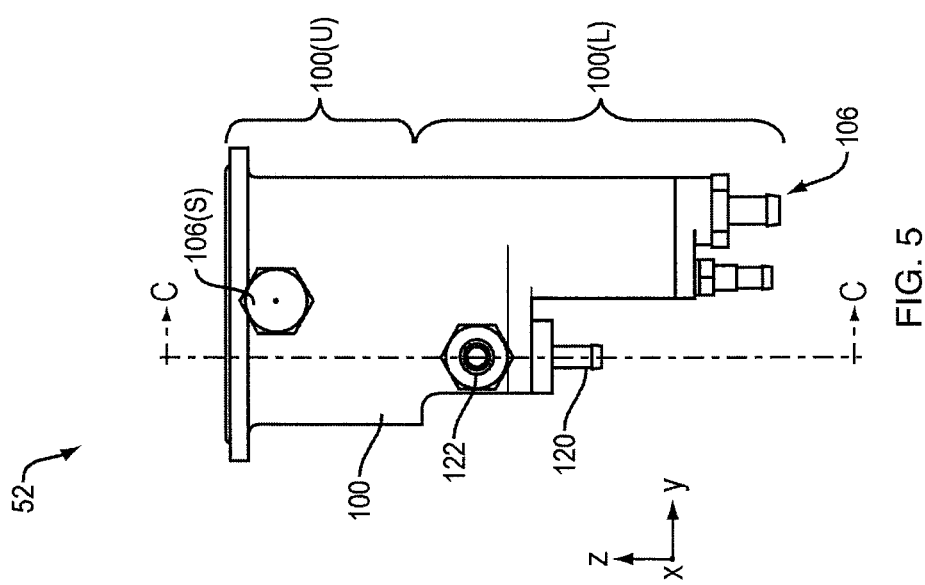

USING A PASSIVE SEPARATOR TO SEPARATE AIR AND FUEL OF A FUEL MIXTURE PASSIVELY WHEN DELIVERING FUEL TO A COMBUSTION ENGINE OF AN UNMANNED AERIAL VEHICLE

BACKGROUND

Some unmanned aerial vehicles (UAVs) include combustion engines that consume liquid fuel. To this end, a typical UAV is equipped with fuel delivery equipment that includes a fuel tank and a fuel pump that connects directly to the fuel tank.

During operation, the fuel pump draws fuel from the fuel tank and provides that fuel under positive pressure to one or more combustion engines. Each combustion engine combusts the fuel for drive (e.g., to rotate a propeller).

When re-fueling the UAV on the ground, a human ground team may remove the remaining fuel from the fuel tank, weigh the UAV, re-fill the fuel tank with fuel, and then re-weigh the UAV. The human ground team considers the difference between weights as a measure of how much fuel is in the fuel tank.

SUMMARY

It should be understood that there are deficiencies to the above-described conventional UAV which has a fuel pump that connects directly to a fuel tank. Along these lines, if there is air (e.g., microbubbles) suspended within the fuel residing in the fuel tank, that air will enter the pathway (e.g., tubing) that leads from the fuel tank to the fuel pump causing a reduction in fuel pump effectiveness. As a result, the fuel pressure within the fuel rail that is downstream from the fuel pump may become unstable and such instability may provide various deleterious effects. For example, such instability may interfere with the pressure regulator which operates to keep the fuel pressure set to a specific value as well as interfere with the fuel injectors which spray fuel into combustion engine chambers. Unfortunately, such inefficient and/or improper operation may be catastrophic for the UAV particularly if the UAV is flying at high altitude.

Moreover, to avoid ingesting a large amount of air into the pathway at one time (particularly when the amount of fuel within the fuel tank is low), the fuel pickup sock that draws the fuel from the bottom of the fuel tank is typically made very small. Unfortunately, while the conventional UAV is sitting on the ground during a re-fueling process in which the UAV is first de-fueled to better ascertain how much fuel is later loaded into the UAV via weight measurements, the small fuel pickup sock makes it more difficult to draw all of the fuel from the fuel tank. As a result, a significant amount of fuel may remain in the fuel tank (e.g., in the outer recesses and edges of the fuel tank) during de-fueling and the estimated amount of fuel in the fuel tank after re-fueling could be significantly less than the actual amount of fuel that is in the fuel tank thus grossly underestimating the amount of available fuel and unnecessarily limiting UAV flight duration (e.g., the human ground team may choose to land the UAV thinking the UAV is about to run out of fuel even though there is substantially more fuel left in the fuel tank).

In contrast to the above-described conventional UAV which has a fuel pump that connects directly to a fuel tank, improved techniques are directed to utilizing an air filtering apparatus which is equipped with a passive air separator that separates air and fuel from a fuel mixture passively before the fuel is delivered to an external fuel pump. This separation of air and fuel improves fuel delivery reliability. Additionally, the passive air separator allows for a light and compact form factor (e.g., no required change in the footprint of an existing fuel delivery system that is retrofitted with the air filtering apparatus). Moreover, the passive air separator alleviates the need for additional resources such as a power source for active air and fuel separation, a control mechanism, and so on that would otherwise increase complexity, reduce efficiency, and be more prone to failure.

One embodiment is directed to a fuel delivery system having a main fuel tank, an external fuel pump, and an air filtering apparatus coupled with the main fuel tank and the external fuel pump. The air filtering apparatus includes a housing that defines a housing chamber, a fuel flow controller coupled with the housing, and a passive separator disposed within the housing chamber. The passive separator is constructed and arranged to separate air and fuel of a fuel mixture passively while the fuel mixture enters the housing chamber from the main fuel tank and while filtered fuel exits the housing chamber toward the external fuel pump in response to operation of the fuel flow controller.

In some arrangements, the main fuel tank defines a fuel tank chamber. Furthermore, the housing of the air filtering apparatus is disposed within the fuel tank chamber defined by the main fuel tank. Such placement within the fuel tank chamber defined by the main fuel tank means that, when retrofitting an existing fuel delivery system with the air filtering apparatus, there is no additional space required.

In some arrangements, the air filtering apparatus further includes a check valve which is coupled with the housing of the air filtering apparatus. The check valve provides a check valve pathway between the housing chamber defined by the housing of the air filtering apparatus and the fuel tank chamber defined by the main fuel tank. Accordingly, there is effective pressure control within the housing and filtered air and excess fuel is able to simply purge back into the fuel tank chamber defined by the main fuel tank.

In some arrangements, the housing of the air filtering apparatus has a lower portion and an upper portion, the upper portion being higher than the lower portion while the air filtering apparatus is disposed within the fuel tank chamber. The check valve mounts to the upper portion of the housing to release air which is separated from the fuel mixture from the housing chamber into the fuel tank chamber during operation of the fuel flow controller of the air filtering apparatus. Accordingly, air that coalesces/percolates to from the lower portion to the upper portion of the housing is released through the check valve (e.g., so the release air then can be vented out through a vent of the fuel tank chamber during re-fueling).

In some arrangements, the air filtering apparatus further includes a fuel supply line that connects to the lower portion of the housing. The fuel supply line is constructed and arranged to carry fuel which is separated from the fuel mixture from the housing chamber toward the external fuel pump.

In some arrangements, the fuel flow controller includes a jet pump having a first input, a second input, and a jet pump output portion. The first input is constructed and arranged to receive fuel returned from the external fuel pump. The second input is constructed and arranged to receive the fuel mixture from the main fuel tank. The jet pump output portion is constructed and arranged to deliver the fuel mixture from the main fuel tank and the fuel returned from the external fuel pump into the housing chamber defined by the housing of the air filtering apparatus.

In some arrangements, the external fuel pump is disposed at a first height. The jet pump is disposed at a second height that is higher than the first height to self-prime the jet pump. Along these lines, due to the particular heights, the path from the jet pump to the external fuel pump is able to remain primed with fuel.

In some arrangements, the passive separator includes porous material that is constructed and arranged to separate the air and the fuel of the fuel mixture by coalescing and dispersing air bubbles from the fuel mixture while the fuel mixture resides within the housing chamber. A suitable porous material is a light-weight foam that is capable of capturing, coalescing, and removing microbubbles within the fuel mixture as the fuel mixture migrates from the jet pump to an opening of the housing of the air filtering apparatus that leads to the external fuel pump.

In some arrangements, the jet pump output portion defines an orifice (or chamber) that points in an upward direction and faces the porous material to provide fuel back pressure that re-primes the jet pump when the jet pump is no longer primed. Along these lines, fuel hitting the porous material tends to fall back into the orifice to automatically re-prime the jet pump.

In some arrangements, the main fuel tank defines a fuel tank chamber and a substantially flat bottom surface that faces the fuel tank chamber. The fuel delivery system further includes a fuel straining assembly disposed (i) within the fuel tank chamber defined by the main fuel tank and (ii) underneath the air filtering apparatus. The fuel straining assembly is constructed and arranged to contact the substantially flat bottom surface defined by the main fuel tank and draw fuel from a bottom region the fuel tank chamber toward the air filtering apparatus.

In some arrangements, the fuel straining assembly includes a fuel pickup sock that covers at least 50% of the substantially flat bottom surface defined by the main fuel tank. The relatively large size of the fuel pickup sock enables enhanced fuel removal (e.g., where as much fuel mixture as possible is removed from the main fuel tank). Furthermore, any air that is drawn from the main fuel tank through the fuel pickup sock is filtered out from the fuel mixture as fuel is delivered from the air filtering apparatus to the external fuel pump.

Another embodiment is directed to an unmanned aerial vehicle (UAV) which includes a UAV body, a combustion engine supported by the UAV body, and a fuel delivery system supported by the UAV body. The fuel delivery system has a main fuel tank, an external fuel pump which is disposed outside of the main fuel tank, and an air filtering apparatus coupled with the main fuel tank and the external fuel pump, the air filtering apparatus including a housing that defines a housing chamber, a fuel flow controller coupled with the housing, and a passive separator disposed within the housing chamber. The passive separator is constructed and arranged to separate air and fuel of a fuel mixture passively while the fuel mixture enters the housing chamber from the main fuel tank and while filtered fuel exits the housing chamber toward the external fuel pump in response to operation of the fuel flow controller.

Another embodiment is directed to a fuel delivery system air filtering apparatus that includes a housing that defines a housing chamber, a fuel flow controller coupled with the housing, and a passive separator disposed within the housing chamber. The passive separator is constructed and arranged to separate air and fuel of a fuel mixture passively while the fuel mixture enters the housing chamber and while filtered fuel exits the housing chamber to supply the filtered fuel to an external fuel pump in response to operation of the fuel flow controller.

Yet another embodiment is directed to a method of operating a UAV. The method includes:
(A) removing fuel from a main fuel tank of the UAV through an air filtering apparatus of the UAV, the main fuel tank defining a fuel tank chamber, the air filtering apparatus being disposed within the fuel tank chamber defined by the main fuel tank, the air filtering apparatus including:
  a housing that defines a housing chamber,
  a fuel flow controller coupled with the housing, and
  a passive separator disposed within the housing chamber, the passive separator being constructed and arranged to separate air and fuel of a fuel mixture passively while the fuel mixture enters the housing chamber from the main fuel tank and while filtered fuel exits the housing chamber toward an external fuel pump in response to operation of the fuel flow controller,
(B) after removing fuel from the main fuel tank of the UAV through the air filtering apparatus of the UAV, adding fuel to the main fuel tank of the UAV through the air filtering apparatus of the UAV; and
(C) after fuel is added to the main fuel tank of the UAV through the air filtering apparatus of the UAV, flying the UAV (e.g., operating, controlling, etc. the UAV from a ground location).

Other embodiments are directed to systems, subsystems and assemblies, components, processes, and so on. Some embodiments are directed to various methods and apparatus which utilize a passive separator to separate air and fuel of a fuel mixture passively when delivering fuel to a combustion engine of a UAV.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 5 is an assembled view of the air filtering apparatus of FIG. 4 in accordance with certain embodiments.

FIG. 6 is a cross-sectional view of the air filtering apparatus of FIG. 4 in accordance with certain embodiments.

DETAILED DESCRIPTION

An improved technique is directed to utilizing an air filtering apparatus which is equipped with a passive air separator that separates air and fuel from a fuel mixture passively before the fuel is delivered to an external fuel pump. Such separation of air and fuel improves fuel delivery reliability. Furthermore, the passive air separator allows for a light and compact form factor. Moreover, the passive air separator alleviates the need for additional resources such as a power source for active air and fuel separation, a control mechanism, and so on that would otherwise increase complexity, reduce efficiency, and be more prone to failure.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
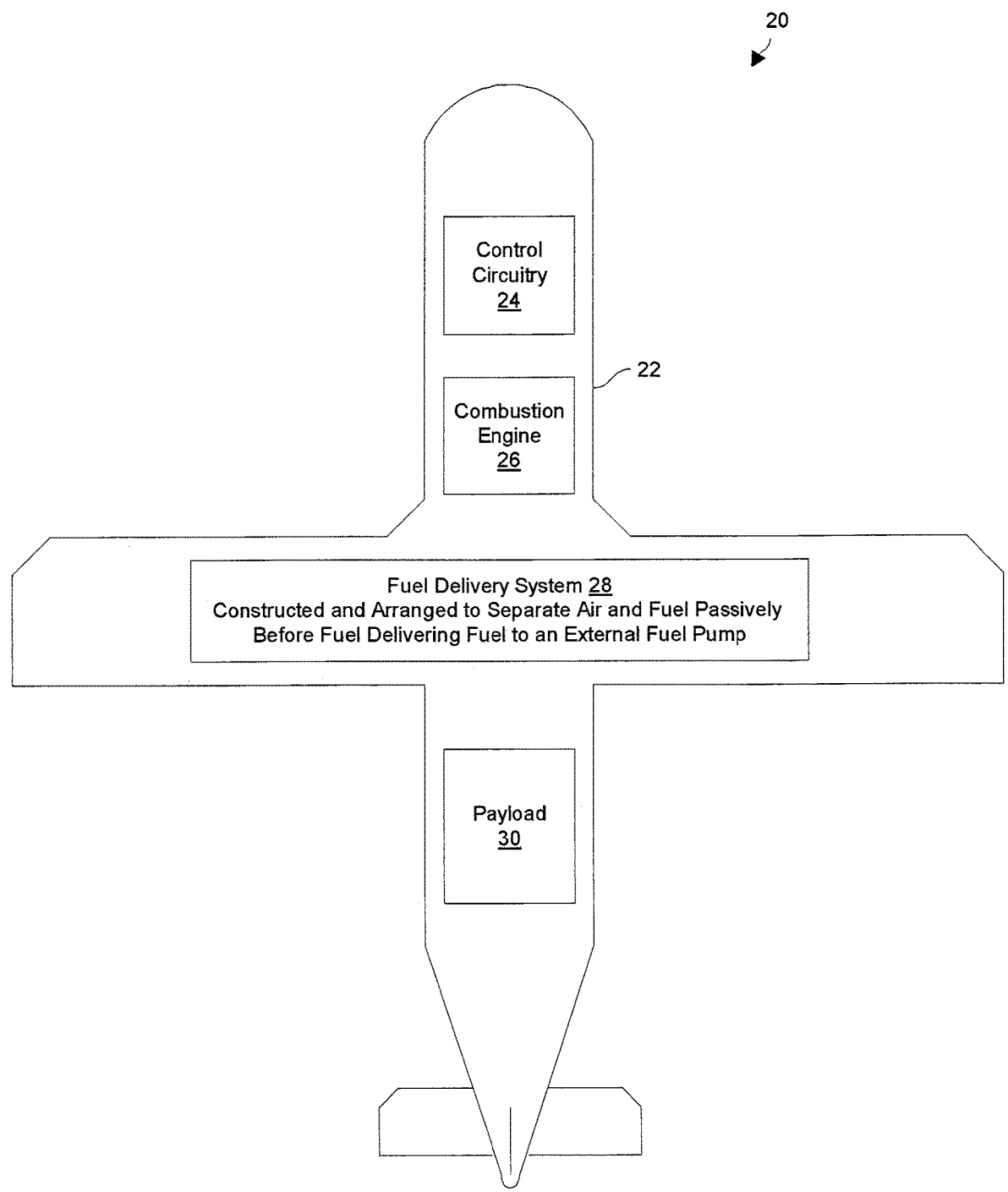
FIG. 1 is a general view of a vehicle which is suitable for utilizing an enhanced fuel delivery system in accordance with certain embodiments.

FIG. 1 shows an example vehicle 20 which is equipped with an enhanced fuel delivery system having a passive air separator that separates air and fuel from a fuel mixture passively before the fuel is delivered to an external fuel pump. The vehicle 20 includes a vehicle body (or support) 22 (e.g., a chassis, a frame, a fuselage, etc.), control circuitry 24, a combustion engine 26, a fuel delivery system 28, and a payload 30. Although these components are not shown coupled together, it should be understood that these components are directly and/or indirectly connected together, e.g., via mechanical/structural elements, electronic wiring/cables, tubing, combinations thereof, and so on.

By way of example, the vehicle 20 is further described below in the context of an unmanned aerial vehicle (or UAV). To this end, the vehicle 20 may have a main portion, wings, a tail, and so on. However, it should be understood that other types of vehicles and installations are suitable for use as well such as ground vehicle, water craft, stationary equipment, etc. which utilize a combustion engine 26 and a fuel delivery system 28.

The vehicle body 22 is constructed and arranged to provide support to the other components such as the control circuitry 24, the combustion engine 26, the fuel delivery system 28, the payload 30, and so on. Additionally, the vehicle body 22 may protect the various components against the environment, tampering, etc. Furthermore, the vehicle body 22 may provide control surfaces that control vehicle operation, e.g., to steer the vehicle 20, to provide flight/lift to the vehicle 20, to stabilize the vehicle 20, etc. Other uses are suitable as well such as power generation, air compression, storage compartments, door(s)/panel(s)/opening(s) for access, combinations thereof, etc.

The control circuitry 24 is constructed and arranged to control various operations of the vehicle 20. For example, in the UAV context, the control circuitry 24 may control engine speed, angles of control surfaces, communications with a ground station, data collection, payload operation and/or deployment, and so on.

The combustion engine 26 is constructed and arranged to receive fuel from the fuel delivery system 28, and to combust that fuel to perform useful work. In some arrangements, the combustion engine 26 drives one or more components (e.g., gears, linkages, transmissions, motors, etc.). In the UAV example, the combustion engine 26 may operate to move the vehicle 20, e.g., turn one or more propellers, gears, rotors, etc. of the UAV.

The fuel delivery system 28 is constructed and arranged to deliver liquid fuel to the combustion engine 26. As will be explained in further detail shortly, the fuel delivery system 28 is provisioned with a passive air separator that separates air and fuel from a fuel mixture before providing the fuel to an external fuel pump that supplies the fuel to the combustion engine 26. Such operation enables the fuel delivery system 28 to provide stable fuel pressure to the combustion engine 26 for healthy and consistent engine operation. Furthermore, such operation enables use of a relatively large fuel pickup sock that enables effective fuel removal during a re-fueling process.

The payload 30 may be carried by the vehicle body 22. Examples include cargo undergoing transport, sensors for surveillance, communications/relaying equipment, beaconing equipment, weaponry, other items, combinations thereof, and so on.

During operation, the fuel delivery system 28 delivers fuel from a fuel tank to the combustion engine 26. During such delivery, the passive air separator passively removes air from the fuel mixture so the fuel provided to the fuel pump has little or no air bubbles that could otherwise interfere with engine operation. Rather, the fuel is supplied under stable pressure for healthy and consistent engine operation. Accordingly, the fuel delivery system 28 provides improved fuel delivery over a conventional approach of simply supplying a fuel pump with fuel mixed with air bubbles (e.g., due to fuel off gassing) directly from a fuel tank.

Additionally, an operator may re-fuel the vehicle 20 between events. In the context of a UAV, the operator may re-fuel the vehicle 20 between UAV missions, e.g., immediately before takeoff, immediately after landing to prepare the UAV for another mission, etc.

The re-fueling process may involve first removing as much fuel as possible from a set of fuel tanks (i.e., one or more tanks) via a relatively large fuel pickup sock covering a large sump area, weighing the vehicle 20 to determine an un-fueled weight for the vehicle 20, adding fuel to the set of fuel tanks, and re-weighing the vehicle 20 to determine fueled weight for the vehicle 20. The difference between the fueled weight and the un-fueled weight indicates how much fuel is currently stored in the set of fuel tanks.

The relatively large fuel pickup sock provides improved fuel removal prior to weighing. Although the larger fuel pickup sock may harbor air (which could be dangerous in a conventional fuel system that is not equipped with a passive air separator as disclosed herein), any air that is introduced by the relatively large fuel pickup sock is removed by the passive air separator and can be vented via an internal overflow return line (e.g., through a check valve) that leads back to the fuel tank. Accordingly, during fuel delivery to the fuel pump, the relatively large fuel pickup sock does not promote air bubble delivery to the fuel pump since the passive air separator removes air bubbles from the fuel mixture before supplying fuel to the fuel pump. Further details will now be provided with reference to FIGS. 2 and 3.

Figure 2:
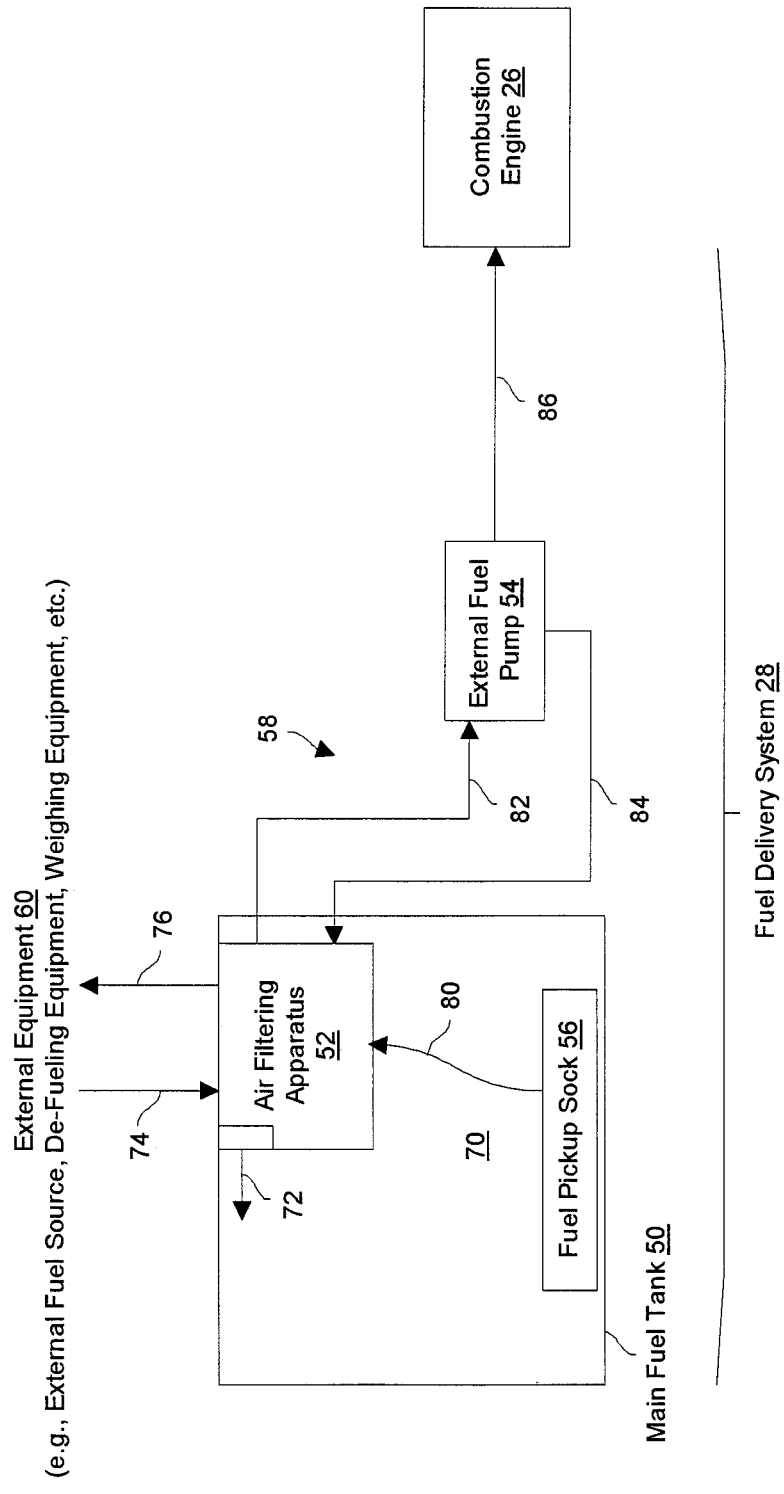
FIG. 2 is a block diagram of a fuel delivery system which is suitable for use by the vehicle in accordance with certain embodiments.
Figure 3:
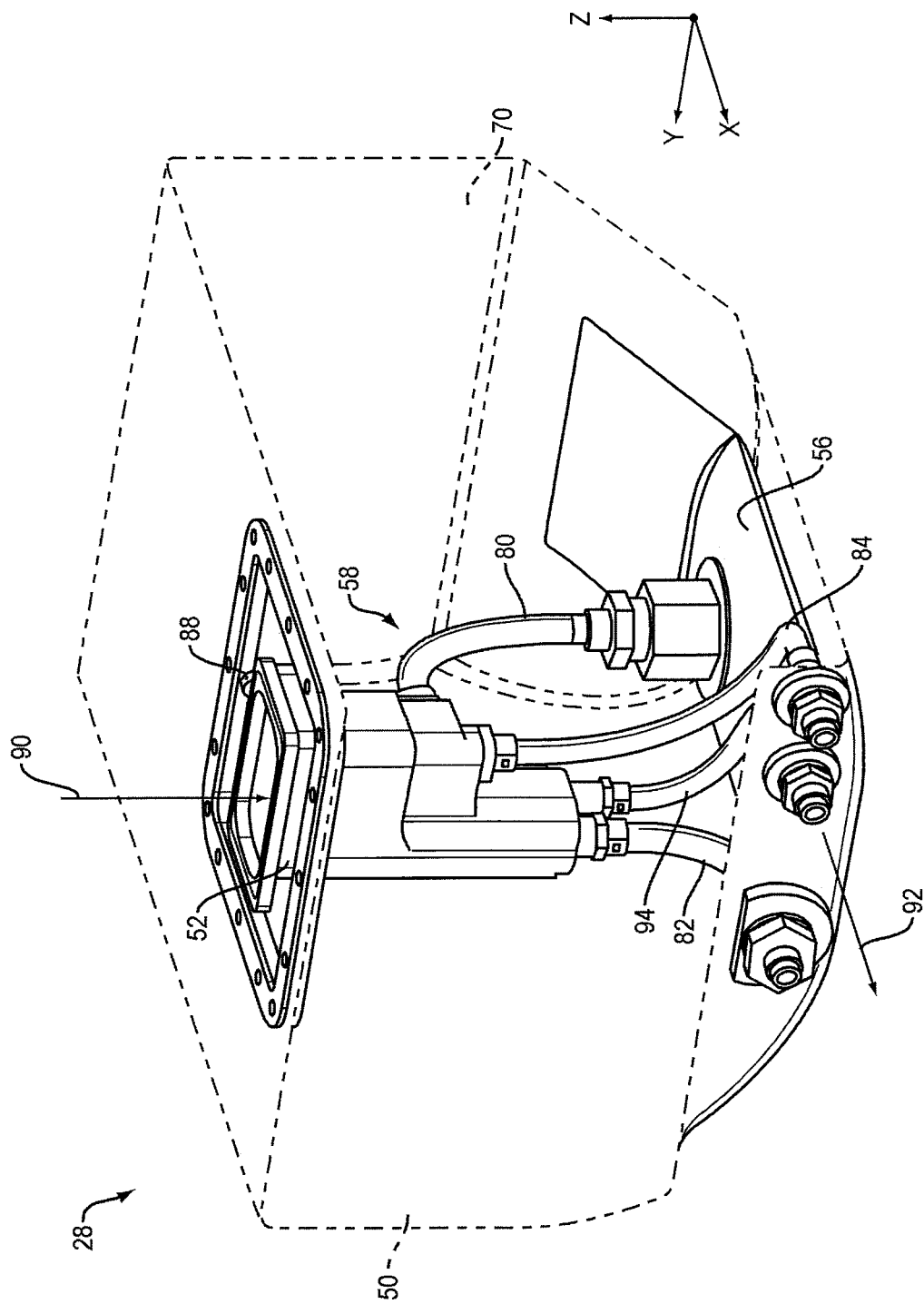
FIG. 3 is a perspective view of a portion of the fuel delivery system of FIG. 2 in accordance with certain embodiments.

FIG. 2 shows, in general block diagram form, particular components of the fuel delivery system 28 in accordance with certain embodiments (also see FIG. 1). FIG. 3 shows a perspective view of certain fuel delivery system components in accordance with certain embodiments. As shown, the fuel delivery system 28 includes a main fuel tank 50, an air filtering apparatus 52, a fuel pump 54 (FIG. 2), a fuel pickup sock 56, and a set of conduits 58. Such fuel delivery system components may be supported directly, indirectly, and/or in part, by the vehicle body 22 (FIG. 1).

The main fuel tank 50 is constructed and arranged to hold a fuel mixture that is supplied by external equipment 60 (e.g., an external fuel source). In some arrangements, the main fuel tank 50 has rigid sections which defines a fuel tank chamber 70 and openings (or vents) that allows air within the fuel tank chamber 70 to escape during re-fueling. The vehicle 20 may include other tanks that drain into the main fuel tank 50.

The air filtering apparatus 52 is constructed and arranged to receive the fuel mixture from the main fuel tank 50 through the fuel pickup sock 56, separate air and fuel of the fuel mixture, and provide the filtered fuel to the external fuel pump 54. With the air removed by the air filtering apparatus 52, the operation of the external fuel pump 54 is more efficient.

The fuel pump 54 (e.g., see FIG. 2) is constructed and arranged to receive filtered fuel from the air filtering apparatus 52, and supply that fuel to the combustion engine 26 for combustion. With the air now removed, fuel pressure and fuel injection is more consistent and reliable. In some arrangements and as will be explained in further detail shortly, the fuel pump 52 further provides fuel back to the air filtering apparatus 52 to operate a jet pump of the air filtering apparatus 52.

The fuel pickup sock 56 is constructed and arranged to draw the fuel mixture from a sump area or bottom region of the fuel tank chamber 70 and provide the fuel mixture to the air filtering apparatus 52. In some arrangements, the sump area is essentially the entire bottom portion of the main fuel tank 50 and the fuel pickup sock 56 covers a significant area of the bottom portion (e.g., at least 50% of the bottom surface area) thus enabling most if not all of the fuel mixture to be drawn from the main fuel tank 50 during a re-fueling process.

The set of conduits 58 defines a set of pathways or channels to, from, and/or among the various components of the fuel delivery system 28. In particular, the set of conduits 58 includes a fuel pickup line 80 to convey the fuel mixture from the main fuel tank 50 to the air filtering apparatus 52 through the fuel pickup sock 56, a fuel supply line 82 to convey fuel from the air filtering apparatus 52 to the external fuel pump 54, a fuel return line 84 to convey fuel from the external fuel pump 54 back to the air filtering apparatus 52, and a fuel rail 86 to convey fuel from the external fuel pump 52 to the combustion engine 26.

In accordance with certain embodiments, the air filtering apparatus 52 is disposed within the fuel tank chamber 70. As a result, there is no additional space consumed by the air filtering apparatus 52, e.g., in the context of installing the air filtering apparatus 52 within a conventional fuel tank during a retrofit or upgrade process.

Additionally, in accordance with certain embodiments and as best seen in FIG. 3, the air filtering apparatus 52 is constructed and arranged with a pathway 88 (e.g., via a check valve) to the fuel tank chamber 70. As a result, any air that is removed from the fuel mixture by the air filtering apparatus 52 may be vented into the fuel tank chamber 70 perhaps with subsequent venting from the fuel tank chamber 70 to the outside. Furthermore, the pathway 88 enables filling of the main fuel tank 50 from an external fuel source through the air filtering apparatus 52 (see the arrow 90).

Furthermore, in accordance with certain embodiments and as best seen in FIG. 3, de-fueling may occur through the air filtering apparatus 52 (see the arrow 92). Here, the fuel mixture is draw through the fuel pickup sock 56 into the air filtering apparatus 52, and then from the air filtering apparatus 52 through a de-fueling line 94 of the set of conduits 58. With the check valve in place, the pathway 88 between to the fuel tank chamber 70 closes thus enabling suction to occur within the air filtering apparatus 52 to draw fuel into the air filtering apparatus 52 through the fuel pickup sock 56. Furthermore, with a relatively large fuel pickup sock 56, very little fuel mixture if any is left at the bottom of the main fuel tank 50 thus providing a more accurate assessment of the amount of fuel mixture loaded back into the main fuel tank 50 during a re-fueling process (e.g., where the amount of fuel mixture is determine by the difference in weight between fully de-fueling and fully re-fueling). With such improved accuracy, there is better precision in terms of remaining fuel during flight and thus enabling longer flight duration.

Moreover, in some arrangements, the air filtering apparatus 52 is located at a higher elevation than the external fuel pump 54. This detail is illustrated by the air filtering apparatus 52 being higher on the Z-axis than the external fuel pump 54 in FIG. 2. Accordingly, the filtered fuel within the fuel supply line 82 from the air filtering apparatus 52 to the external fuel pump 54 is under positive pressure. Further details will now be provided with reference to FIGS. 4 through 6.

Figure 4:
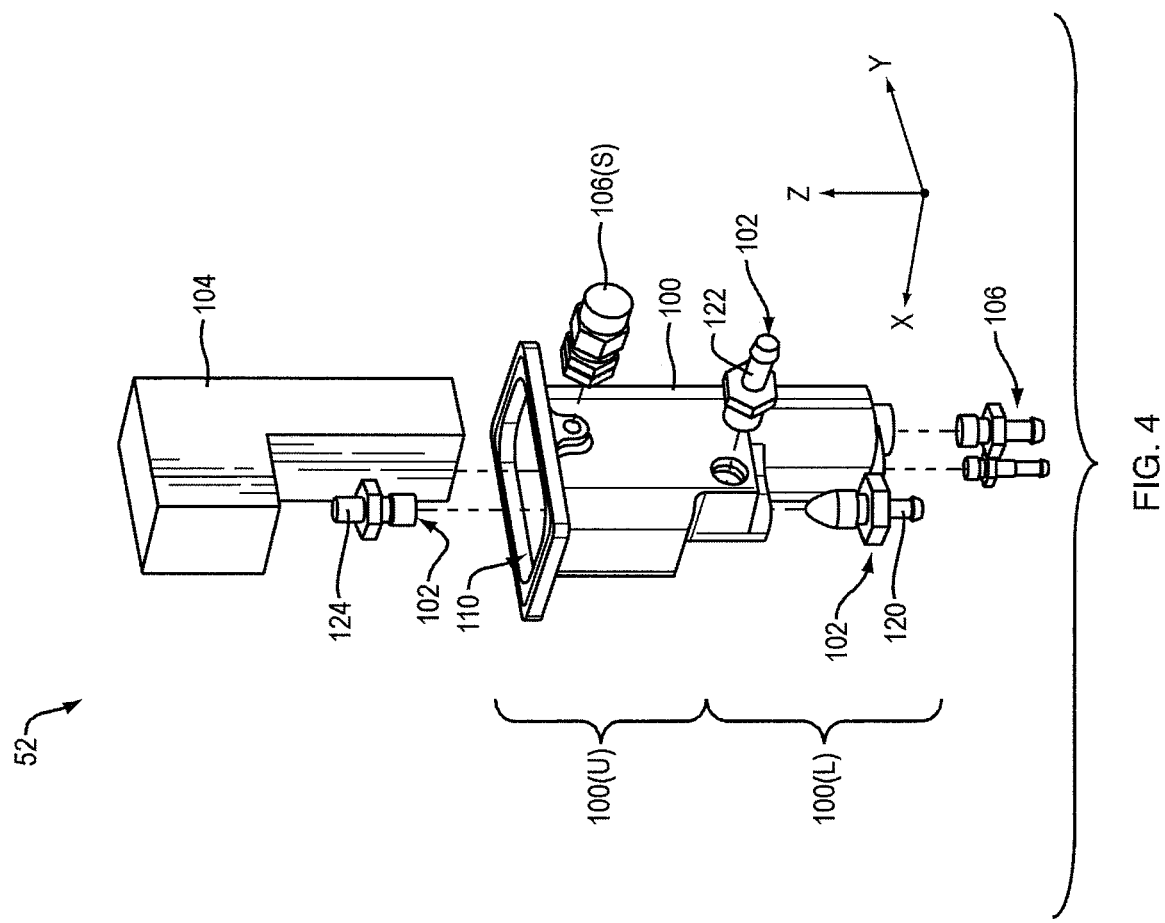
FIG. 4 is an exploded view of the air filtering apparatus in accordance with certain embodiments.

FIGS. 4 through 6 show particular details of the air filtering apparatus 52. FIG. 4 is an exploded view of the air filtering apparatus 52 in accordance with certain embodiments. FIG. 5 is an assembled view of the air filtering apparatus 52 in accordance with certain embodiments. FIG. 6 is a cross-sectional side view (along cross-section C-C in FIG. 5) of the air filtering apparatus 52 in accordance with certain embodiments.

As best seen in FIG. 4, the air filtering apparatus 52 includes a housing 100, a fuel flow controller 102, a passive separator 104, and additional hardware 106. Some components may be hidden from view or not shown in certain figures for simplification.

The housing 100 defines a housing chamber 110, and provides support for the various other components of the air filtering apparatus 52 such as the fuel flow controller 102, the passive separator 104, and the additional hardware 106. In some arrangements, housing 100 includes a lower portion 100(L) and an upper portion 100(U) which is higher than the lower portion 100(L) (along the Z-axis) when the air filtering apparatus 52 is installed within the fuel tank chamber 70.

The fuel flow controller 102 mounts to the housing 100 is constructed and arranged move the fuel mixture from the fuel tank chamber 70 (FIGS. 2 and 3) to the housing chamber 110 defined by the housing 100. In some arrangements, the fuel flow controller 102 includes a jet pump having a first input 120 that receives fuel returned from the external fuel pump 54, a second input 122 that receives the fuel mixture from the main fuel tank 50, and a jet pump output portion 124 that delivers the fuel mixture from the main fuel tank 50 and the fuel returned from the external fuel pump 54 into the housing chamber 110.

In some embodiments, the jet pump has a self-priming arrangement in which the jet pump either remains primed or re-primes automatically if the jet pump loses priming. To this end, the first input 120 leads to a nozzle/orifice that outputs fuel received from the external fuel pump 54 through the jet pump output portion 124. Such movement of fuel (e.g., a fuel stream) creates a vacuum that draws additional fuel mixture from the fuel tank chamber 70 (via the fuel pickup sock 56) through the second input 122. The fuel from both inputs 120, 122 reaches and passes through the passive separator 104 where air and fuel are then separated passively. It should be understood that, if the jet pump loses priming, the fuel that hits the passive separator 104 tends to fall back into the jet pump output portion 124 (e.g., a tapered orifice) thus re-priming the jet pump. Accordingly, the fuel flow controller 102 does not need any initial manual priming to begin or restart operation.

The passive separator 104 (FIG. 4) is disposed within the housing chamber 110 and is constructed and arranged to separate air and fuel of a fuel mixture passively while the fuel mixture enters the housing chamber 110 from the main fuel tank 50 and while filtered fuel exits the housing chamber 110 toward the external fuel pump 54 in response to operation of the fuel flow controller 102. Since the air and the fuel of the fuel mixture separate passively, there is no need for a power source for active air and fuel separation, a control mechanism, etc. that would otherwise increase complexity, reduce efficiency, and be more prone to failure. Furthermore, it should be appreciated that since the air filtering apparatus 52 removes air, the fuel pickup sock 56 may be substantially large since air drawn by the fuel pickup sock 56 will be separated from the fuel mixture rather than be provided to the external fuel pump 54.

In some arrangements, the passive separator 104 includes porous material that is constructed and arranged to separate the air and the fuel of the fuel mixture by coalescing and dispersing air bubbles from the fuel mixture while the fuel mixture resides within the housing chamber 110. Along these lines, the porous material may include a mesh or a foam that allows the fuel to easily flow (or percolate) therethrough while capturing and combining small air bubbles (e.g., microbubbles) into larger bubbles. In some situations, the porous material substantially fills the housing chamber 110 (e.g., the porous material may mirror the shape of the housing chamber 110) thus reducing sloshing that could promote air bubbles as well as maximizing air and fuel separation. Eventually, the air migrates to the top of the housing chamber 110 and discharges through specialized hardware 106(S).

In certain embodiments, the specialized hardware 106(S) includes a check valve which mounts to the upper portion 100(U) of the housing 100 (e.g., flush with the top of the housing 100) and which provides a check valve pathway between the housing chamber 110 and the fuel tank chamber 70 (also see 88 in FIG. 3). During operation of the fuel flow controller 102, positive pressure builds within the housing chamber 110 and the check valve releases filtered air and excess fuel back into the fuel tank chamber 70 (also see FIGS. 2 and 3). Accordingly, the pressure within the housing chamber 110 remains consistent and provides positive fuel pressure to the fuel that is output to the external fuel pump 54 (FIG. 2). Moreover, such a configuration enables the main fuel tank 50 to be filled through the air filtering apparatus 52, i.e., where the fuel mixture from an external fuel source initially enters the housing chamber 110 and then escapes through the check valve into the fuel tank chamber 70. Due to operation of the check valve (i.e., where the check valve closes in response to lower pressure in the housing chamber 110 than in the fuel tank chamber 70), the housing chamber 110 remains full.

Likewise, the main fuel tank 50 may be emptied through the air filtering apparatus 52. In particular, the additional hardware 106 includes a port that connects to the earlier-mentioned de-fueling line 94 (also see FIG. 3 and arrow 92).

It should be understood that the fuel tank chamber 70 may hold porous material as well to prevent sloshing and promote air filtering within the fuel tank chamber 70. In such a situation, the recirculation of excess fuel back into the main fuel tank 50 further filters the fuel mixture thus minimizing bubbles within the fuel mixture. Further details will now be provided with reference to FIG. 7.

Figure 7:
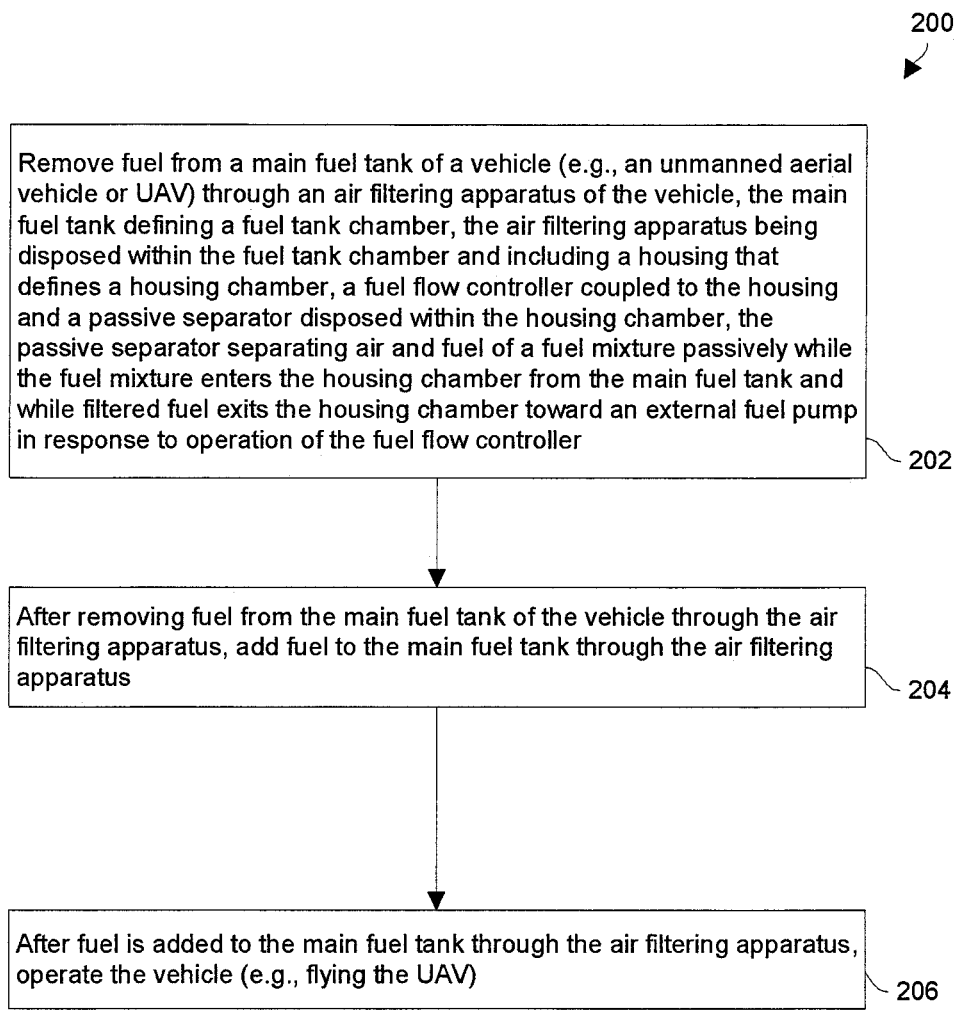
FIG. 7 is a flowchart of a procedure which is performed via an air filtering apparatus in accordance with certain embodiments.

FIG. 7 shows a vehicle procedure 200 which involves re-fueling a vehicle (e.g., a UAV). The procedure 200 utilizes an air filtering apparatus and may be performed by an operator such as a human crew, robotics, automated equipment, electronics, combinations thereof, and so on.

At 202, the operator removes fuel from a main fuel tank of the vehicle through the air filtering apparatus. As mentioned with reference to FIGS. 1 through 6 and in accordance with certain embodiments, the main fuel tank defines a fuel tank chamber. Additionally, the air filtering apparatus is disposed within the fuel tank chamber defined by the main fuel tank. The air filtering apparatus includes a housing that defines a housing chamber, a fuel flow controller coupled with the housing, and a passive separator disposed within the housing chamber. The passive separator is constructed and arranged to separate air and fuel of a fuel mixture passively while the fuel mixture enters the housing chamber from the main fuel tank and while filtered fuel exits the housing chamber toward an external fuel pump in response to operation of the fuel flow controller. For example, the operator may drain the fuel through a special port of the air filtering apparatus rather than directly from the main fuel tank.

At 204, the operator, after removing fuel from the main fuel tank of the vehicle through the air filtering apparatus of the vehicle, adds fuel to the main fuel tank of the vehicle through the air filtering apparatus of the vehicle. In some arrangements, the operator may weigh the vehicle immediately after removing the fuel (i.e., de-fueling) and immediately after adding the fuel. The difference in weight indicates how much fuel is currently in the main fuel tank.

At 206, the operator, after fuel is added to the main fuel tank of the vehicle through the air filtering apparatus of the vehicle, operates the vehicle. For example, in the context of a UAV, the operator flies the UAV with an accurate indication of how much fuel is in the UAV.

As described above, improved techniques are directed to utilizing an air filtering apparatus 52 which is equipped with a passive air separator 104 that separates air and fuel from a fuel mixture passively before the fuel is delivered to an external fuel pump 54. This separation of air and fuel improves fuel delivery reliability. Additionally, the passive air separator 104 allows for a light and compact form factor (e.g., no required change in the footprint of an existing fuel delivery system that is retrofitted with the air filtering apparatus 52). Moreover, the passive air separator 104 alleviates the need for additional resources such as a power source for active air and fuel separation, a control mechanism, and so on that would otherwise increase complexity, reduce efficiency, and be more prone to failure.

While various embodiments of the present disclosure have been particularly shown and described, it will be understood by those skilled in the art that various changes in form and details may be made therein without departing from the spirit and scope of the present disclosure as defined by the appended claims. Such modifications and enhancements are intended to belong to various embodiments of the disclosure.

It should be understood that the disclosed technology is well-suited for aircraft fuel systems. In certain embodiments, the technology reduces or prevents air ingestion while consuming fuel during high altitude flight.

That is, some conventional aircraft succumb to ingestion of aerated fuel at high altitude. However, in accordance with certain improved embodiments disclosed herein, a jet pump is included in a header tank that effectively separates air and fuel passively while meeting minimal weight and space requirements.

Both the external fuel pump (e.g., a micro gear pump) and the jet pump may be initially primed due to the unique fueling through the header tank. The required header tank volume is also greatly reduced due to using foam (or similar porous material) as an air and fuel separator. This foam also allows the jet pump to re-prime itself (due to a geometry in which fuel falls back over the jet pump output).

Additionally, a check valve with a controlled orifice is placed at the top of the header tank. Once fueled through the header tank, the check valve closes due to suction (while the pump is off) and the header tank will stay full. The suction side of the jet pump is attached to a large surface area fuel pickup sock that increases the sump area effectiveness. During de-fueling, the check valve also closes and allows the tank to be completely defueled through the fuel pickup sock. While the main pump is running, the small orifice in the check valve also allows pressure to be generated allowing the external fuel pump to have positive inlet pressure at all times. This system is unique because the external fuel pump is more accessible, fuel delivery is very reliable with only passive components in the tank, the jet pump with header tank is very light and compact, and the percentage of unrecoverable fuel is superior to other fuel systems. All these aspects make this design advantageous to UAVs with requirements constraining size, weight, and reliability.

It should be further understood that, in some traditional combustion engine fuel injected systems, there is a pickup sock in the fuel tank that filters and catches fuel. The fuel is pulled through the pickup sock and is routed to the external pump. Since there is air suspended in the fuel, the air comes out over time and collects in the fuel pickup sock and associated tubing. Fuel aeration at this point in the system is critical because the fuel pump cannot flow air effectively. Downstream of the fuel pump is the engine injector where the fuel is sprayed into the combustion chamber(s) of the combustion engine. In order to keep the fuel rail pressure stable in the traditional system, the fuel pump supplies excess fuel flow to the engine. Excess fuel that does not flow through the engine injector flows to the pressure regulator which keeps the fuel pressure set at a specific value. After the pressure regulator, the excess fuel is simply dumped back into the main tank.

However, with certain improvements disclosed herein, a return flow from an external fuel pump powers a jet pump which acts like an extra pump inside of the main fuel tank. This jet pump easily moves air as well as fuel. The return line is the motive flow and filter pickup line is the suction flow to the jet pump, all geometrically integrated into the header tank. The header tank effectively separates the air and fuel by using its unique geometry as well as a foam (or similar porous material) that prevents air from being carried directly to the engine fuel supply. This air collects on the foam and coalesces to form larger bubbles that can effectively rise to the top and port out of the header tank through the check valve into the main fuel tank. The check valve further enables fueling and de-fueling through the header tank. The check valve also contains a controlled orifice which allows positive head pressure at the external fuel pump. Since the fuel pickup sock may be very large, de-fueling through the sock is more effective and results in a more accurate assessment of how much fuel is loaded into the vehicle, i.e., after de-fueling, there is minimal fuel left in the tank.

What is claimed is:

1. A fuel delivery system, comprising:
   a main fuel tank;
   an external fuel pump; and
   an air filtering apparatus coupled with the main fuel tank and the external fuel pump, the air filtering apparatus including:
      a housing that defines a housing chamber,
      a fuel flow controller coupled with the housing, and
      a passive separator disposed within the housing chamber, the passive separator being constructed and arranged to separate air and fuel of a fuel mixture passively while the fuel mixture enters the housing chamber from the main fuel tank and while filtered fuel exits the housing chamber toward the external fuel pump in response to operation of the fuel flow controller;
   wherein the passive separator includes:
      porous material that is constructed and arranged to separate the air and the fuel of the fuel mixture by coalescing and dispersing air bubbles from the fuel mixture while the fuel mixture resides within the housing chamber.

2. A fuel delivery system as in claim 1 wherein the main fuel tank defines a fuel tank chamber; and
   wherein the housing of the air filtering apparatus is disposed within the fuel tank chamber defined by the main fuel tank.

3. A fuel delivery system as in claim 2 wherein the air filtering apparatus further includes a check valve which is coupled with the housing of the air filtering apparatus; and
   wherein the check valve provides a check valve pathway between the housing chamber defined by the housing of the air filtering apparatus and the fuel tank chamber defined by the main fuel tank.

4. A fuel delivery system as in claim 3 wherein the housing of the air filtering apparatus has a lower portion and an upper portion, the upper portion being higher than the lower portion while the air filtering apparatus is disposed within the fuel tank chamber; and
   wherein the check valve mounts to the upper portion of the housing to release air which is separated from the fuel mixture from the housing chamber into the fuel tank chamber during operation of the fuel flow controller of the air filtering apparatus.

5. A fuel delivery system as in claim 4 wherein the air filtering apparatus further includes a fuel supply line that connects to the lower portion of the housing; and
   wherein the fuel supply line is constructed and arranged to carry fuel which is separated from the fuel mixture from the housing chamber toward the external fuel pump.

6. A fuel delivery system as in claim 1 wherein the fuel flow controller includes a jet pump having:
- a first input constructed and arranged to receive fuel returned from the external fuel pump,
- a second input constructed and arranged to receive the fuel mixture from the main fuel tank, and
- a jet pump output portion constructed and arranged to deliver the fuel mixture from the main fuel tank and the fuel returned from the external fuel pump into the housing chamber defined by the housing of the air filtering apparatus.

7. A fuel delivery system as in claim 6 wherein the external fuel pump is disposed at a first height; and
- wherein the jet pump is disposed at a second height that is higher than the first height to self-prime the jet pump.

8. A fuel delivery system as in claim 7 wherein the passive separator includes:
- porous material that is constructed and arranged to separate the air and the fuel of the fuel mixture by coalescing and dispersing air bubbles from the fuel mixture while the fuel mixture resides within the housing chamber.

9. A fuel delivery system as in claim 8 wherein the jet pump output portion defines an orifice that points in an upward direction and faces the porous material to provide fuel back pressure that re-primes the jet pump when the jet pump is no longer primed.

10. A fuel delivery system, comprising:
- a main fuel tank;
- an external fuel pump; and
- an air filtering apparatus coupled with the main fuel tank and the external fuel pump, the air filtering apparatus including:
  - a housing that defines a housing chamber,
  - a fuel flow controller coupled with the housing, and
  - a passive separator disposed within the housing chamber, the passive separator being constructed and arranged to separate air and fuel of a fuel mixture passively while the fuel mixture enters the housing chamber from the main fuel tank and while filtered fuel exits the housing chamber toward the external fuel pump in response to operation of the fuel flow controller;
- wherein the main fuel tank defines a fuel tank chamber and a substantially flat bottom surface that faces the fuel tank chamber; and
- wherein the fuel delivery system further comprises:
  - a fuel straining assembly disposed (i) within the fuel tank chamber defined by the main fuel tank and (ii) underneath the air filtering apparatus, the fuel straining assembly being constructed and arranged to contact the substantially flat bottom surface defined by the main fuel tank and draw fuel from a bottom region the fuel tank chamber toward the air filtering apparatus.

11. A fuel delivery system as in claim 10 wherein the fuel straining assembly includes a fuel pickup sock that covers at least 50% of the substantially flat bottom surface defined by the main fuel tank.

12. An unmanned aerial vehicle (UAV), comprising:
- a UAV body;
- a combustion engine supported by the UAV body; and
- a fuel delivery system supported by the UAV body, the fuel delivery system having:
  - a main fuel tank,
  - an external fuel pump which is disposed outside of the main fuel tank, and
  - an air filtering apparatus coupled with the main fuel tank and the external fuel pump, the air filtering apparatus including:
    - a housing that defines a housing chamber,
    - a fuel flow controller coupled with the housing, and
    - a passive separator disposed within the housing chamber, the passive separator being constructed and arranged to separate air and fuel of a fuel mixture passively while the fuel mixture enters the housing chamber from the main fuel tank and while filtered fuel exits the housing chamber toward the external fuel pump in response to operation of the fuel flow controller;
- wherein the passive separator includes:
  - porous material that is constructed and arranged to separate the air and the fuel of the fuel mixture by coalescing and dispersing air bubbles from the fuel mixture while the fuel mixture resides within the housing chamber.

13. A UAV as in claim 12 wherein the main fuel tank of the fuel delivery system defines a fuel tank chamber; and
- wherein the housing of the air filtering apparatus of the fuel delivery system is disposed within the fuel tank chamber defined by the main fuel tank.

14. A UAV as in claim 12 wherein the fuel flow controller of the air filtering apparatus includes a jet pump having:
- a first input constructed and arranged to receive fuel returned from the external fuel pump,
- a second input constructed and arranged to receive the fuel mixture from the main fuel tank, and
- a jet pump output portion constructed and arranged to deliver (i) the fuel mixture from the main fuel tank and (ii) the fuel returned from the external fuel pump into the housing chamber defined by the housing of the air filtering apparatus into the housing chamber.

15. An unmanned aerial vehicle (UAV), comprising:
- a UAV body;
- a combustion engine supported by the UAV body; and
- a fuel delivery system supported by the UAV body, the fuel delivery system having:
  - a main fuel tank,
  - an external fuel pump which is disposed outside of the main fuel tank, and
  - an air filtering apparatus coupled with the main fuel tank and the external fuel pump, the air filtering apparatus including:
    - a housing that defines a housing chamber,
    - a fuel flow controller coupled with the housing, and
    - a passive separator disposed within the housing chamber, the passive separator being constructed and arranged to separate air and fuel of a fuel mixture passively while the fuel mixture enters the housing chamber from the main fuel tank and while filtered fuel exits the housing chamber toward the external fuel pump in response to operation of the fuel flow controller;
- wherein the main fuel tank of the fuel delivery system defines a fuel tank chamber and a substantially flat bottom surface that faces the fuel tank chamber; and
- wherein the fuel delivery system further includes:
  - a fuel pickup sock disposed (i) within the fuel tank chamber defined by the main fuel tank and (ii) underneath the air filtering apparatus, the fuel pickup sock being constructed and arranged to contact the substantially flat bottom surface defined by the main fuel tank and draw fuel from a bottom region the fuel tank chamber into the air filtering apparatus, the fuel pickup sock that covering at least 50% of the substantially flat bottom surface defined by the main fuel tank.

16. A fuel delivery system air filtering apparatus, comprising:
   a housing that defines a housing chamber;
   a fuel flow controller coupled with the housing; and
   a passive separator disposed within the housing chamber, the passive separator being constructed and arranged to separate air and fuel of a fuel mixture passively while the fuel mixture enters the housing chamber and while filtered fuel exits the housing chamber to supply the filtered fuel to an external fuel pump in response to operation of the fuel flow controller;
   wherein the passive separator includes:
      porous material that is constructed and arranged to separate the air and the fuel of the fuel mixture by coalescing and dispersing air bubbles from the fuel mixture while the fuel mixture resides within the housing chamber.

17. A fuel delivery system air filtering apparatus as in claim 16 wherein the housing is constructed and arranged to install within a fuel tank chamber defined by a main fuel tank.

18. A fuel delivery system air filtering apparatus as in claim 17 wherein the fuel flow controller includes a jet pump having:
   a first input constructed and arranged to receive fuel returned from the external fuel pump,
   a second input constructed and arranged to receive the fuel mixture from the main fuel tank, and
   a jet pump output portion constructed and arranged to deliver the fuel mixture from the main fuel tank and the fuel returned from the external fuel pump into the housing chamber defined by the housing.

19. A method of operating an unmanned aerial vehicle (UAV), the method comprising:
   removing fuel from a main fuel tank of the UAV through an air filtering apparatus of the UAV, the main fuel tank defining a fuel tank chamber, the air filtering apparatus being disposed within the fuel tank chamber defined by the main fuel tank, the air filtering apparatus including:
      a housing that defines a housing chamber,
      a fuel flow controller coupled with the housing, and
      a passive separator disposed within the housing chamber, the passive separator being constructed and arranged to separate air and fuel of a fuel mixture passively while the fuel mixture enters the housing chamber from the main fuel tank and while filtered fuel exits the housing chamber toward an external fuel pump in response to operation of the fuel flow controller,
   after removing fuel from the main fuel tank of the UAV through the air filtering apparatus of the UAV, adding fuel to the main fuel tank of the UAV through the air filtering apparatus of the UAV; and
   after fuel is added to the main fuel tank of the UAV through the air filtering apparatus of the UAV, flying the UAV;
   wherein the passive separator includes porous material that is constructed and arranged to separate the air and the fuel of the fuel mixture by coalescing and dispersing air bubbles from the fuel mixture while the fuel mixture resides within the housing chamber.

20. A method as in claim 19 wherein the main fuel tank further defines a substantially flat bottom surface that faces the fuel tank chamber; and
   wherein removing the fuel from the main fuel tank includes:
      drawing the fuel through a fuel straining assembly disposed (i) within the fuel tank chamber defined by the main fuel tank and (ii) underneath the air filtering apparatus, the fuel straining assembly being constructed and arranged to contact the substantially flat bottom surface defined by the main fuel tank and draw fuel from a bottom region the fuel tank chamber toward the air filtering apparatus.

* * * * *